United States Patent Office 3,418,333
Patented Dec. 24, 1968

3,418,333
SALTS OF IMIDAZOLES AND
BENZIMIDOZOLES
Daniel Warren, East Brunswick, N.J., assignor to
Shell Oil Company, New York, N.Y., a corporation of Delaware
No Drawing. Original application Apr. 20, 1964, Ser. No. 361,224, now Patent No. 3,356,645, dated Dec. 5, 1967. Divided and this application July 20, 1967, Ser. No. 664,583
8 Claims. (Cl. 260—309)

ABSTRACT OF THE DISCLOSURE

Novel heterocyclic compounds possessing in the heterocyclic ring (1) a substituted C=N—C group and (2) a secondary amino group, i.e., an =N—H group are disclosed. These imidazoles, such as the substituted imidazoles and benzimidazoles, are useful liquid epoxy curing agents.

---

This application is a division of application Ser. No. 361,224, filed Apr. 20, 1964, now U.S. Patent 3,356,645.

This invention relates to a process for curing polyepoxides. More particularly, this invention relates to a new process for curing polyepoxides, to novel curing agents used in the process, and to useful products obtained from the process.

Specifically, this invention provides a new process for curing polyepoxides, and preferably polyglycidyl polyethers of polyhydric phenols and polyhydric alcohols, which comprises mixing and reacting the polyepoxide with a salt of a heterocyclic nitrogen compound which possesses in the ring (1) a substituted C—N=C group and (2) an —NH— group, and preferably a salt of an imidazole compound having the structural formula

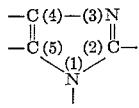

such as, 2-ethyl-4-methylimidazole acetate, benzimidazole acetate, and imidazole lactate. This invention further provides cured products obtained by the above process and relates to the novel curing agents described in detail hereinafter.

Polyepoxides, such as, for example, those obtained by reacting epicholorohydrin with polyhydric phenols in the presence of caustic, are promising materials for use in many industrial applications as they can be converted with curing agents to form insoluble, infusible products having good chemical resistance. Many conventional polyepoxide-curing agent systems, however, have certain drawbacks that greatly limit the industrial use of the polyepoxides. For example, the known mixtures comprising the polyepoxides and aliphatic amines set up rather rapidly. This is true even though the mixtures are stores in airtight containers away from moisture and air. This characteristic necessitates mixing of the components just before use and rapid use of the material before cure sets in. Such a procedure places a considerable burden on the individual operators, and in many cases, gives inferior products because of (1) inefficient mixing, and (2) operations are conducted too rapidly.

Attempts have been made in the past to solve the above problem by the use of curing agents which are more difficult to react and would, thus, remain inactive in the polyepoxide composition at lower temperatures. While this action tends to lengthen the pot life or working time of the compositions, it also makes the compositions more difficult to cure. For example, it is known that the pot life can be extended by the use of aromatic amine curing agents. When aromatic amine curing agents are employed in curing polyepoxides, however, semi-thermoplastic or B-stage resins are rapidly formed during the early stages of cure, that is, before the molecules are all crosslinked. These resins are hard and brittle and consequently, little time is available in which to work with the resins before they set up. It would be desirable, therefore, to have a curing agent or catalyst which would give long pot life and at the same time would form a resin-catalyst system which remains pliable during the early stages of cure, i.e., B-stages very slowly, allowing greater working time in regard to handling of the resins. This is important in applications, such as, molding compounds, laminates, castings, etc.

It is an object of this invention, therefore, to provide a new class of liquid curing agents for polyepoxides. It is a further object to provide new curing agents for polyepoxides which give compositions having a relatively long pot life, B-stage very slowly, and remain pliable for a greater period of time. It is a further object to provide new compositions useful for formulating molding compounds, laminates, castings, and the like. These and other objects of this invention will be apparent from the following detailed description thereof.

It has now been discovered that these and other objects may be accomplished by using as curing agents for the polyepoxides, salts of certain heterocyclic compounds which possess in the ring (1) a substituted C—N=C group and (2) an —NH— group, and preferably a salt of an imidazole compound, such as 2-ethyl-4-methylimidazole acetate, benzimidazole acetate, and imidazole lactate. It has been surprisingly found that polyepoxide compositions containing these imidazole salts in low concentrations have extended pot lives, yet cure rapidly at elevated temperatures. Filled compositions utilizing liquid resins remain putty-like as they advance in cure and have specific advantages in being dust free and extrudable. Thus, the compositions are useful in continuous molding processes. The salts also find utility in applications, such as laminates and castings, either filled or unfilled.

Additional advantage is also found in that the imidazole salts are usually liquids or very low temperature melting solids, whereas normally amine salts are solids with relatively high melting points. Thus, the imidazole liquid amine salts may be incorporated into the polyepoxide system with ease without considerable stirring and without applying heat to the system.

The new curing agents useful in the process of this invention comprise salts of the heterocyclic compounds possessing in the heterocyclic ring (1) a substituted C=N—C group and (2) a secondary amino group, i.e., an =N—H group. Preferred examples of these heterocyclic compounds include, among others, the imidazoles, such as substituted imidazoles and benzimidazoles having the structural formulas

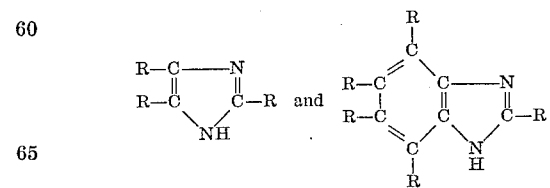

respectively, wherein R is selected from hydrogen atoms, halogen atoms, or an organic radical, such as a hydrocarbon radical or a substituted hydrocarbon radical, for example, the ester, ether, amide, imide, amino, halogen, or mercapto substituted hydrocarbon radicals. The acid portion of the salt is selected from an acid, such as phosphoric, acetic, lactic, formic, and the like. Especially preferred imidazoles are those wherein the substituent is hydrogen or a hydrocarbon radical, and preferably an alkyl, alkenyl, cycloalkyl, cycloalkenyl, aryl, alkaryl or arylalkyl radicals, and particularly those containing no more than 15 carbon atoms and wherein the acid is selected from monocarboxylic acids having from 1 to 8 carbon atoms, lactic, and phosphoric acids.

A more detailed description of the chemistry of the imidazoles and benzimidazoles including their properties and structural formulas is found in the book by Klaus Hofmann entitled "Imidazole and Its Derivatives" published by Interscience Publishers, Inc., New York (1953). Examples of imidazole salts include, among others, the acetate, formate, lactate, and phosphate salts of imidazole, benzimidazole, and substituted imidazoles. Examples suitable substituted imidazoles include: 2-methylimidazole; 2-ethyl-4-methylimidazole; 2-cyclohexyl-4-methylimidazole; 4-butyl-5-ethylimidazole; 2-butoxy-4-allylimidazole; 2-carboethoxybutyl - 4 - methylimidazole, 2-octyl-4-hexylimidazole; 2 - methyl - 5- ethylimidazole; 2-ethyl-4-phenylimidazole; 2-amide-5-ethylimidazole; 2-ethyl-4-(2-ethylamino)-imidazole; 2-methyl - 4 - mercaptoethylimidazole; 2-butylacetate-5-methyl-imidazole; 2,5-chloro-4-ethylimidazole; and mixtures thereof. Especially preferred are the alkyl-substituted imidazole acetates and lactates wherein the alkyl groups contain not more than 8 carbon atoms each, or mixtures thereof, and particularly preferred are 2-ethyl-4-methylimidazole acetate, 2-ethyl-4-methylimidazole lactate, 2-methylimidazole acetate, 2-methylimidazole lactate, imidazole acetate, imidazole lactate, and mixtures thereof.

The above-described imidazole salts can be prepared by reacting the imidazole with the acid to form the corresponding amine salt. The imidazoles are prepared by conventional techniques of reacting a dialdehyde with ammonia and formaldehyde. The salts are preferably prepared by mixing the desired acid with the imidazole and maintaining the temperature between 23° and 100° C. Solvents are not necessary but may be employed if desired. One should use at least one gram molecular weight of acid to each gram molecular weight of the imidazole. If greater stability is desired, one should use a larger ratio, i.e., up to a 2:1 ratio of acid to imidazole. The higher the acid level, the more stable the resin-catalyst mixture. The reaction is preferably accomplished at temperatures between 23° C. and 150° C. As heat is evolved in the reaction, cooling means may be needed to keep the temperature in the desired range.

The polyepoxides to be used in preparing the compositions of the present invention comprise those materials possessing more than one vicinal epoxy group, i.e., more than one

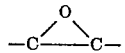

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 1,12-octadecadienoate, butyl 9,12-15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl)adipate,
di(2,3-epoxybutyl)oxalate,
di(2,3-epoxy-hexyl)succinate,
di(3,4-epoxybutyl)maleate,
di(2,3-epoxyoctyl)pimelate,
di(2,3-epoxybutyl)phthalate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(5,6-epoxytetradecycl)diphenyldicarboxylate,
di(3,4-epoxyheptyl)-sulfonyldibutyrate,
tri(2,3-epoxybutyl)1,2,4-butanetricarboxylate,
di(5,6-epoxypentadecyl)tartarate,
di(4,5-epoxytetradecyl)maleate,
di(2,3-epoxybutyl)azelate,
di(3,4-epoxybutyl)citrate,
di(5,6-epoxyoctyl)cyclohexane-1,2-dicarboxylate,
di(4,5-epoxyoctadecyl)-malonate.

Another group of the epoxy-containing materials includes those epoxidized esters of unsaturated alcohols and unsaturated carboxylic acids, such as 2,3-epoxybutyl-3,4-epoxypentanoate,
3,4-epoxyhexyl,
3,4-epoxypentanoate,
3,4-epoxycyclohexyl-3,4-epoxycyclohexanoate,
3,4-epoxycyclohexyl-4,5-epoxyoctanoate,
2,3-epoxycyclohexylmethyl epoxycyclohexane carboxylate.

Still another group of the epoxy-containing materials included epoxidized derivatives of polyethylenically unsaturated polycarboxylic acids, such as, for example, dimethyl 8,9,12,13-diepoxyeicosanedioate,
dibutyl 7,8,11,12-diepoxyoctadecanedioate,
dioctyl 10,11-diethyl-8,9,12,13-diepoxy-eiconsanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among other, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type. Other examples include the polyglycidyl ether of 1,1,2,2-tetrakis(4-hydroxyphenyl) ethane (epoxy value of 0.45 eq./100 g. and melting point 85° C.) polyglycidyl ether of 1,1,5,5-tetrakis(hydroxyphenyl)pentane (epoxy value of 0.514 eq./100 g.) and the like and mixtures thereof. Other examples include the glycidated novolacs as obtained by reacting epichlorohydrin with novon resins obtained by condensation of aldehyde with polyhydric phenols.

The quantities in which the polyepoxides and the heterocyclic curing agents are combined will vary over a wide range. To obtain the best cure, the heterocyclic curing agent is preferably employed in amounts varying from about 0.1% to about 30% by weight of the polyepoxide, and still more preferably from 1 to 15 by weight of the polyepoxide.

The heterocyclic curing agent can be used in combination with other components such as phenols, mercaptans, triphenyl phosphorus, triphenyl arsenic, triphenyl antimony, amines, amine salts or quaternary ammonium salts, etc. Preferred additives include the mercaptans, phenols, triphenyl phosphorus and the amines, such as, for example, benzyldimethylamine, dicyandiamide, p,p'-bis(dimethylaminophenyl)methane, pyridine, dimethylaniline, benzyldimethylamine, dimethylethanolamine, methyldiethanamine, morpholine, dimethylaminopropylamine, dibutylaminopropylamine, stearyldimethylamine, tri-n-butyl amine, triamylamine, tri-n-hexylamine, ethyl di-n-propylamine, m-phenylenediamine, diethylenetriamine and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like, and mixtures thereof. Other additives include polybasic anhydrides, such as, for example, phthalic anhydride, tetrahydrophthalic anhydride, methyl-3,6 - endomethylene - 4 - tetrahydrophthalic anhydride, chlorendic anhydride, pyromellitic dianhydride, and the like, and the corresponding acids.

The above-noted additives are generally employed in amounts varying from 0.1 part to 25 parts per 100 parts of polyepoxide, and preferably from 1 part to 5 parts per 100 parts of polyepoxide.

The curing of the polyepoxides may be accomplished by mixing the polyepoxides with the heterocyclic amine salt catalyst and heating the resulting composition at elevated temperatuers, i.e., 150° C. The temperatures employed during the cure may vary over a wide range. In general, temperatures ranging from about 60° to 200° C. will give satisfactory results. Preferred temperatures range from about 100 to 175° C. Additional materials, etc., pigment, stabilizers, plasticizers and diluents may be added. One may also add material to accelerate the reaction of the curing agent such as phenols, amines, mercaptans and the like.

The heterocyclic amine salt catalysts at low levels of concentration impart long term room temperature stabiliy to epoxy resins, e.g., molding materials, without affecting the cure cycle. Because of its stability, the resin-catalyst system β-stages very slowly and remains pliable as it advances in curing allowing time for the material to be molded. The catalysts therefore, are very useful in formulating molding compounds and can be utilized in continuous molding operations.

The compositions of this invention are also useful for preparing laminates. In preparing the laminate, the sheets of fibrous material are first treated with the mixture of polyepoxide and curing agent. This is conveniently accomplished by spreading the paste or solution containing the above-noted mixture onto the sheets or glass cloth, paper, textiles, etc. The sheets are then superimposed and the assembly cured under heat and pressure. The assembly is preferably cured in a heated press under a pressure of about 25 to 500 or more pounds per square inch and temperatures of about 150° C. The resulting laminate is extremely strong and resistance against heat and the action of organic and corrosive solvents.

The fibrous material used in the preparation of the laminates may be of any suitable materials, such as glass cloth and matting, paper, asbestos paper, mica flakes, cotton bats, duck muslin, canvas, synthetic fibers such as nylons, dacron, and the like. It is usually preferred to utilize woven glass cloth that has been given prior treatment with well known finishing or sizing agents, therefore, such as chrome methacrylate or vinyl trichlorosilane.

The compositions of this invention are further useful in filament windings and in casting applications, such as encapsulation and/or embedment of electrical devices and preparation of cast foams containing microballoons.

To illustrate the manner in which the invention may be carried out, the following examples are given. It is understood, however, that the examples are for purposes of illustration and the invention is not to be regarded as limited to any of the specific materials or conditions therein. Polyepoxides referred to by letter are those described in U.S. 2,633,458.

EXAMPLE I

This example illustrates the preparation of 2-ethyl-4-methylimidazole acetate and its use as a curing agent for Polyether A, i.e., a glycidyl ether of 2,2-bis(4-hydroxyphenyl)propane.

Preparation 110 g. (1 mol) of 2-ethyl-4-methylimidazole is placed in a reaction vessel fitted with a stirrer. 120 g. (2 mols) of glacial acetic acid is added to the vessel over a period of 10 minutes while maintaining continuous stirring. The temperature is maintained between 60° C. and 80° C. for a period of one hour to complete the reaction. Upon cooling, the salt is ready for use. The 2-ethyl-4-methylimidazole acetate is a light amber colored liquid which darkens upon aging to a deep red-brown color.

Use as curing agent 100 parts of Polyether A and 5 parts of 2-ethyl-4-methylimidazole acetate are thoroughly mixed. The composition at room temperature has a pot life of 5 days.

EXAMPLE II (A) 100 parts of polyether A and 5 parts of 2-ethyl-4-methylimidazole acetate plus 300 parts of silica filler are thorougly mixed. The composition at room temperature has a pot life of 3 weeks. When heated at 150° C., the composition cures to from a hard, insoluble, infusible resin having excellent chemical resistance.

(B) 100 parts of Polyether A and 10 parts of 2-ethyl-4-methylimidazole acetate plus 300 parts of silica filler are thoroughly mixed. The composition at room temperature has a pot life of 2 weeks. When heated at 150° C., the composition cures to form a hard, insoluble, infusible resin having excellent chemical resistance.

(C) (B) above is repeated with the exception that 25 parts of crude methylenedianiline is used in place of 10 parts of 2-ethyl-4-methylimidazole acetate.

The gel times of compositions (A) and (B) are shown in Table I below in comparison with composition (C).

TABLE I

[Formulation: Polyether A/curing agent, 100 parts; filler[1], 300 parts]

| Curing Agent Type | Phr[2] | Gel times in seconds at 150° C. after below-indicated number of storage days | | | | | | | | | | |
|---|---|---|---|---|---|---|---|---|---|---|---|---|
| | | Initial | 1 | 2 | 3 | 6 | 8 | 10 | 13 | 17 | 20 | 22 |
| 2-ethyl 4-methyl-imidazole acetate | 5 | 117 | 87 | 70 | 59 | 44 | 39 | 35 | 34 | 33 | 30 | 30 |
| | 10 | 62 | 54 | 51 | 45 | 35 | 32 | 30 | 31 | 23 | 25 | 24 |
| Methylene dianiline (crude) | 25 | 165 | 95 | 44 | 28 | 22 | 20 | <15 | | | | |

[1] Filler consists essentially of silica ($SiO^2$).
[2] Phr means parts per hundred parts resin.

EXAMPLE III

This example illustrates the preparation of imidazole lactate and its use as a curing agent for Polyether A.

Preparation 68 g. (1 mol) of imidazole is placed in a reaction vessel fitted with a stirrer. 185 g. of 85% lactic acid (1.75 mole) is added to the vessel over a period of 10 minutes while maintaining continuous stirring. The temperature is maintained between 60° C. and 80° C. for 1 hour to complete the reaction. The imidazole lactate is lemon colored liquid at room temperature.

Use as curing agent 100 parts of Polyether A and 3 parts of imidazole lactate are thoroughly mixed. The composition at room temperature has a pot life of greater than 10 days.

When heated at 150° C., the composition cures to form a resin similar to those of Example I, (a) and (b) having similar properties and gelling times.

EXAMPLE IV

This example illustrates the preparation of 2-methylimidazole acetate.

82 g. (1 mol) of 2-methylimidazole is placed in a reaction vessel fitted with a tirrer. 90 g. (1.5 mols) of glacial acetic acid is added to the vessel over a period of 10 minutes while maintaining continuous stirring. The temperature is maintained between 60° and 80° C. for 1 hour to complete the reaction. Upon cooling, the 2-methylimidazole acetate crystallizes to form a white solid melting at approximately 30° C.

EXAMPLE V

Example I is repeated with the exception that Polyether A is replaced by an equivalent amount of a glycidated novalac resin obtained by reacting a phenol-formaldehyde condensate with epichlorohydrin is mixed with 2-ethyl-4-methylimidazole acetate. Similar results are obtained.

EXAMPLES VI AND VII

Example I is repeated with the exception that Polyether A is replaced by an equivalent amount of diglycidyl ether of resorcinol and by a 50:50 mixture of Polyether A and epoxidized methyl cyclohexyl methylcyclohexenecarboxylate, respectively. Related results are obtained.

EXAMPLES VIII TO XXII

These examples illustrate the preparation of various imidazole salts and their use as curing agents for Polyether A.

VIII—2-butyl-4-allylimidazole acetate
IX—2-ethyl-4-methylimidazole lactate
X—2-methyl-5-ethylimidazole lactate
XI—2-ethyl-4-(2-ethylamino)imidazole phosphate
XII—2-amido-5-ethylimidazole acetate
XIII—2-methyl-4-mercaptoethylimidazole formate
XIV—2-butyl-5-methylimidazole acetate
XV—2,5-dichloro-4-ethylimidazole lactate
XVI—2-carbo-ethoxybutyl-4-methylimidazole acetate
XVII—2-methylimidazole lactate
XVIII—2-methylimidazole acetate
XIX—imidazole lactate
XX—imidazole acetate
XXI—benzimidazole lactate
XXII—benzimidazole acetate

Preparation

Each of the above imidazole salts are formed by following the procedure of Example I, i.e., reacting 1 mol of the imidazole with 1–2 mols of acid to form the corresponding imidazole salt.

Use as curing agents

In each case, 2 to 10 parts of an above salt is thoroughly mixed with 100 parts of Polyether A, the resulting composition has excellent pot life and when heated at 150° C. cures to form a hard insoluble, infusible product having good high temperature properties. The gel times of the various Polyether A imidazole salt compositions of this example are similar to those of the Polyether A/2-ethyl-4-methyl imidazole acetate compositions of Example I wherein 5 phr. curing agent were employed.

I claim as my invention:

1. An acid salt of an imidazole compound selected from the group consisting of

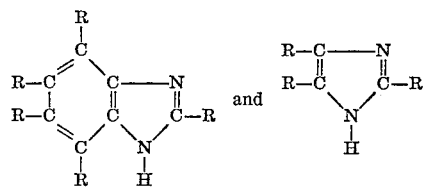

and mixtures thereof wherein R is selected from the group consisting of hydrogen and alkyl of up to 8 carbon atoms and the acid is selected from the group consisting of alkanoic acids of from 1 to 8 carbon atoms, lactic acid and phosphoric acid.

2. An acid salt as in claim 1 wherein the imidazole compound is 2-ethyl-4-methylimidazole.

3. An acid salt as in claim 1, wherein the imidazole compound is 2-methylimidazole.

4. An acid salt as in claim 1 wherein the imidazole compound is imidazole.

5. An acid salt as in claim 1 wherein the imidazole compound is benzimidazole.

6. An acid salt as in claim 1 wherein the imidazole compound is benzimidazole and the acid is lactic acid.

7. An acid salt as in claim 1 wherein the imidazole compound is benzimidazole and the acid is acetic acid.

8. An acid salt of an imidazole compound selected from the group consisting of 2-butyl-4-allylimidazole acetate, 2-ethyl-4-(2-ethylamino)imidazole phosphate, 2-amido-5-ethylimidazole acetate, 2-methyl-4-mercaptoethylimidazole formate, 2,5-dichloro-4-ethylimidazole lactate and 2-carbo-ethoxybutyl-4-methylimidazole acetate.

(References on following page)

References Cited

UNITED STATES PATENTS

| | | | |
|---|---|---|---|
| 2,005,538 | 6/1935 | Engelmann | 260—309 |
| 2,404,299 | 7/1946 | Kyrides | 260—309 |
| 2,404,300 | 7/1946 | Kyrides et al. | 260—309 |
| 2,846,411 | 8/1958 | Meyer et al. | 260—45.4 |
| 2,944,062 | 7/1960 | Hoffmann et al. | 260—309.2 |
| 3,080,282 | 3/1963 | Shunk | 260—309.2 |

OTHER REFERENCES

Chambon et al.: Chem. Abst. vol. 49, columns 9630–1 (1955).

Dixit et al.: Jour. Indian Chem. Soc. vol 38, p. 856 relied on (1961).

Grindly et al.: Chem. Abst. vol. 2, columns 1157–8 (1928).

Ochiai et al., Chem. Abst., vol. 33, columns 4988–9 (1939).

Pozharskii Zhurl. Obsh. Khim., vol. 34, pp. 630–5 (February 1964).

HENRY R. JILES, *Primary Examiner.*

N. TROUSOF, *Assistant Examiner.*

U.S. Cl. X.R.

260—309.2, 348